(12) United States Patent
Kojima

(10) Patent No.: US 7,905,470 B2
(45) Date of Patent: Mar. 15, 2011

(54) VIBRATION DAMPER

(75) Inventor: Hiroshi Kojima, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 10 days.

(21) Appl. No.: 12/442,317

(22) PCT Filed: Sep. 13, 2007

(86) PCT No.: PCT/JP2007/067860
§ 371 (c)(1),
(2), (4) Date: Mar. 20, 2009

(87) PCT Pub. No.: WO2008/035619
PCT Pub. Date: Mar. 27, 2008

(65) Prior Publication Data
US 2010/0038195 A1   Feb. 18, 2010

(30) Foreign Application Priority Data

Sep. 22, 2006 (JP) ................................. 2006-257164

(51) Int. Cl.
*F16M 1/00* (2006.01)
(52) U.S. Cl. ................................................. 267/140.14
(58) Field of Classification Search .................. 188/266, 188/267.1, 267.2; 267/140.11, 140.13–140.15
See application file for complete search history.

(56) References Cited

U.S. PATENT DOCUMENTS

| | | | | |
|---|---|---|---|---|
| 4,720,087 A | * | 1/1988 | Duclos et al. | 267/140.14 |
| 5,052,662 A | * | 10/1991 | Doi | 267/140.14 |
| 5,176,368 A | * | 1/1993 | Shtarkman | 267/140.14 |
| 5,284,330 A | * | 2/1994 | Carlson et al. | 267/140.14 |
| 5,398,917 A | * | 3/1995 | Carlson et al. | 267/140.14 |
| 5,839,720 A | * | 11/1998 | Kojima | 267/140.14 |
| 2005/0023092 A1 | * | 2/2005 | Kim | 188/267.2 |

FOREIGN PATENT DOCUMENTS

| | | |
|---|---|---|
| JP | 02-081939 A | 3/1990 |
| JP | 02-203001 A | 8/1990 |
| JP | 08-035536 A | 2/1996 |

* cited by examiner

*Primary Examiner* — Christopher P Schwartz
(74) *Attorney, Agent, or Firm* — Sughrue Mion, PLLC

(57) ABSTRACT

An object of the present invention is to obtain a vibration damper capable of instantly changing or rapidly increasing the spring constant of the vibration damper, with improving sealing properties. An intermediate cylinder 16 is fittingly engaged with the inner peripheral surface of an outer cylindrical metal member 12. The intermediate cylinder 16 and a mounting metal member 22 are elastically connected by a rubber elastic body 24. A circular tube portion 36A of a yoke forming member 36 is provided at a position on the inner peripheral side of the intermediate cylinder 16. A coil 46 is to disposed between the intermediate cylinder 16 and the yoke forming member 36. A pressure receiving liquid chamber 40 in which a portion of an inner wall thereof is formed of the rubber elastic body 24 communicates via an orifice 44 with a secondary liquid chamber 42 which is elastically deformable due to presence of a diaphragm 38, such that a magnetism responsive fluid can flow in either direction between the pressure receiving liquid chamber and the second liquid chamber. A yoke portion 36C is provided on the inner peripheral side of the circular tube portion 36A such that the yoke portion 36C is situated along magnetic path which is generated upon electrical activation of the coil 46.

3 Claims, 9 Drawing Sheets

VIBRATION DAMPER

TECHNICAL FIELD

The present invention relates to a vibration damper for absorbing vibrations generated by a vibration generating portion to prevent the vibrations from being transferred to a vibration receiving portion. The vibration damper of the present invention is applicable, for example, to a liquid sealed-in type vibration damper for use as a torque rod, an engine mount or the like for an automobile or an industrial machine in general.

PRIOR ART

There has been conventionally known, for example, a torque rod or an engine mount of liquid sealed-in type having an elastic body, a pressure-receiving liquid chamber, a secondary liquid chamber and the like provided therein such that the pressure receiving liquid chamber communicates with the secondary liquid chamber by way of an orifice as a restriction passage. According to such a conventional torque rod or an engine mount, when vibrations are generated, transfer of these vibrations is suppressed by absorbing the vibrations by vibration-damping function of the elastic body, viscosity resistance of the liquid flowing through the orifice which communicates between the pressure-receiving liquid chamber and the secondary liquid chamber, and the like.

In a vehicle having a torque rod or an engine mount installed therein as described above it has been contemplated to instantly harden the torque rod or the like by instantly increasing the spring constant thereof in order to respond to emergency braking or improve driving stability. However, among the conventional vibration dampers using conventional liquid, none of them has a structure capable of instantly increasing the spring constant thereof.

Examples of the conventional technique which allows the spring constant to be instantly increased include: an engine mount disclosed in JP2-081939 having a magnetism responsive fluid sealed-in structure; and a shock absorber as shown in FIG. 10 employing an electromagnetic actuator in accordance with use of a magnetism responsive fluid sealed therein. This shock absorber has a structure in which a piston 114 movable inside a cylinder 112 has an electromagnet constituted of a coil 116 and a yoke 118 provided on the outer peripheral side of the coil and the wiring 116A connected to the coil 116 comes out of a shaft 122 of the piston 114.

Accordingly, in the aforementioned shock absorber, a voltage is applied to the coil 116 by way of the wiring 116A to deprive the magnetism responsive fluid flowing through the orifice 120 as a passage between the coil 116 and the yoke 118, of fluidity, so that the spring constant of the fluid is instantly increased.

DISCLOSURE OF THE INVENTION

Problems to be Solved by the Invention

It has been contemplated as described above to make the spring constant of a vibration damper variable by instantly increasing the spring constant thereof in order to respond to emergency braking and improve driving stability. However, in the case of the torque rod or engine mount having the conventional structure using the conventional liquid, there has been available no structure capable of changing the spring constant thereof so that the spring constant instantly increases.

Further, it has been contemplated to instantly increase the spring constant by utilizing a magnetism responsive fluid. However, in the case of the engine mount disclosed in JP2-081939, not only the communication passage of the engine mount is narrow but also the engine mount lacks a secondary liquid chamber, whereby the spring constant cannot be changed in a required range. Further, in the case of the shock absorber described above, since the shock absorber has a structure in which the wiring 116A for applying a voltage to the coil 116 comes out of the shaft 122 of the movable piston 114, sealing properties is not satisfactory and there arises a problem that the magnetism responsive fluid may leak from the portion where the wiring 116 comes out of the piston.

In view of the above-described facts, an object of the present invention is to provide a vibration damper capable of instantly changing or rapidly increasing the spring constant, with improving sealing properties thereof.

Means for Solving the Problem

A vibration damper of claim 1 comprises: a first mounting member connected to one of a vibration generating portion and a vibration receiving portion; a second mounting member connected to the other of the vibration generating portion and the vibration receiving portion an elastic body provided between the first mounting member and the second mounting member to connect the fist mounting member and the second mounting member in an elastically deformable manner, a pressure-receiving liquid chamber filed with a magnetism responsive fluid, at least a portion of an inner wall of the pressure-receiving liquid chamber being formed of the elastic body; a secondary liquid chamber, a portion of a partition wall thereof being formed deformable such that an inner volume of the secondary liquid chamber can be increased/decreased in accordance with change in an inner pressure; an orifice communicating between the pressure-receiving liquid chamber and the secondary liquid chamber to allow the magnetism responsive fluid to pass therethrough; a coil provided around the orifice, for magnetizing the magnetism responsive fluid inside the orifice when the coil is electrically activated; and a control unit for controlling electric activation of the coil.

An effect of the vibration damper of claim 1 will be described below. According to the vibration damper as recited, when a vibration is inputted from the vibration generating portion side to one of the first mounting member and the second mounting member constituting the vibration damper, the elastic body provided between the first mounting member and the second mounting member is elastically deformed due to the inputted vibration, whereby the vibration is absorbed by the attenuating influence based on inner frictions or the like of the elastic body and the vibration transferred to the vibration receiving portion side is reduced.

Further, the pressure receiving liquid chamber in which at least a portion of an inner wall thereof is formed by the elastic body communicates, via the orifice, with the secondary liquid chamber in which a portion of a partition wall thereof is formed deformable. Therefore, when a vibration is inputted from the vibration generating portion side, the inner volume of the pressure receiving liquid chamber filled with the magnetism responsive fluid is increased/decreased in accordance with the elastic deformation of the elastic body and the magnetism responsive fluid is made to flow in either direction via the orifice between the pressure receiving liquid chamber and the secondary liquid chamber of which inner volume can be increased/decreased in accordance with change in the inner pressure. As a result, a resonance phenomenon occurs in the magnetism responsive fluid in the orifice, synchronous with the inputted vibration, whereby due to viscosity resistance and change in pressure associated with the resonance phenomenon of the magnetism responsive fluid, the inputted vibrations can be effectively absorbed.

According to the vibration damper of the present claim, a coil is provided around the orifice and time/timing in/on which the coil is electrically activated is controlled by the control unit, so that the magnetism responsive fluid in the orifice is magnetized during the electric activating time or on the electric activating timing of the coil by the control unit. Specifically, When the coil is electrically activated, the magnetism responsive fluid in the orifice loses fluidity and is hardened, whereby not only the resonance phenomenon of the magnetism responsive fluid as described above is prevented from occurring but also the elastic body forming at least a part of the inner wall of the pressure receiving liquid chamber becomes less likely to deform, thereby allowing the spring constant to instantly change or rapidly increase.

Further, according to the vibration damper of the present claim, the coil is arranged around the orifice. As a result, not only electromagnetic force is efficiently applied to the magnetism responsive fluid in the orifice and but also the wiring can be more easily taken out of the coil, thereby eliminating a possibility that the magnetism responsive fluid may leak from the portion where the wiring comes out of the coil and thus improving sealing properties of the magnetism responsive fluid.

As described above, according to the vibration damper of the present claim, sealing properties of the magnetism responsive fluid can be improved by arranging the coil around the orifice. Further, by electrically activating the coil thus arranged, the spring constant can be instantly changed or rapidly increased. As a result, in a case in which the vibration damper of the present invention is employed as a torque rod or an engine mount, the engine can be instantly supported in a fixed manner according to necessity and, due to this, there are obtained significant improvements in driving stability, as well as in responding to emergency braking of a vehicle.

An effect of the vibration damper of claim 2 of the present invention will be described below. The vibration damper of the present claim causes an effect similar to that of claim 1. The vibration damper of the present claim has a structure in which a yoke is provided in the orifice such that the yoke is situated along magnetic path which is generated when the coil is electrically activated.

Specifically, since the yoke, formed as an iron core disposed with the orifice, is positioned on magnetic path where magnetic field line generated upon electrical activation of the coil passes, electromagnetic force is efficiently applied to the magnetism responsive fluid. As a result, the state of the magnetism responsive fluid can be changed by using less electric power than the conventional vibration damper.

An effect of the vibration damper of claim 3 will be described below. The vibration damper of the present claim causes an effect similar to that of claim 1. The vibration damper of the present claim has a structure in which a yoke forming member including a yoke as a portion thereof is formed in a tube-like shape and the orifice is formed such that it penetrates through the yoke forming member. That is, since the orifice is formed such that it penetrates through the tube-shaped yoke forming member, the vibration damper can be made smaller, while maintaining the capacity of changing the state of the magnetism responsive fluid by using less electric power than the conventional vibration damper.

An effect of the vibration damper of claim 4 of the present invention will be described below. The vibration damper of the present claim causes an effect similar to that of claim 1.

The vibration damper of the present claim has a structure in which a yoke forming member, having a shaft-like yoke provided at the center portion thereof and through holes formed around the yoke, is disposed on the inner peripheral side of the coil and the through holes provided in the yoke forming member constitute a part of the orifice.

Specifically, a shaft-like yoke is provided at the center portion of the yoke forming member disposed on the inner peripheral side of the coil, through holes are formed around the yoke, and these through holes constitute a part of the orifice. Accordingly, as is the case with the vibration damper of claim 3, the vibration damper of the present claim can be made smaller with maintaining the capacity of changing the state of the magnetism responsive fluid by using less electric power than the conventional vibration damper.

An effect of the vibration damper of claim 5 of the present invention will be described below. The vibration damper of the present claim causes an effect similar to that of claim 1. The vibration damper of the present claim has a structure in which the vibration generating portion is an engine, the vibration receiving portion is a vehicle body, the control unit includes sensors for detecting states of the engine and the vehicle body, and the control unit controls electric activation of the coil on the basis of information from the sensors.

That is, since the control unit includes sensors for detecting states of the engine and the vehicle body, the control unit can reliably grasp the states of the engine and the vehicle body, thereby electrically activating the coil at an appropriate timing. For example, during a normal running, the vibration damper of the present claim can be made to have a structure of a common liquid sealed-in type vibration damper by turning off the voltage with respect to the coil to make it possible that the magnetism responsive fluid flows in the orifice. In contrast, in a case of emergency braking or when driving stability is required, such emergency braking of a vehicle can be made or driving stability can be improved by applying a voltage to the coil and hardening the magnetism responsive fluid to temporality increase the spring constant.

EFFECT OF THE INVENTION

As described above, according to the aforementioned structures of the present invention, there is obtained a superior effect that a vibration damper can be provided which improves sealing properties and allows the spring constant thereof to be is instantly changed or rapidly increased.

EXPLANATION OF REFERENCE NUMBERS

10 Vibration damper
12 Outer Cylindrical metal member (Second mounting member)
16 Intermediate cylinder (Second mounting member)
22 Mounting member (First mounting member)
24 Rubber elastic body (Elastic body)
26 Disc plate for bracket (Second mounting member)
40 Pressure receiving liquid chamber
42 Secondary liquid chamber
44 Orifice
36 Yoke forming member
36C Yoke portion (Yoke)
36D Through hole
48 Controller (control unit)
50 Speed sensor (Control unit)
52 Rotation rate sensor (Control unit)
M Magnetic path

BEST MODE FOR CARRYING OUT THE INVENTION

A vibration damper of a first embodiment of the present invention is shown in FIGS. 1 to 4. The embodiment will be described with reference to these figures.

Figure 1:
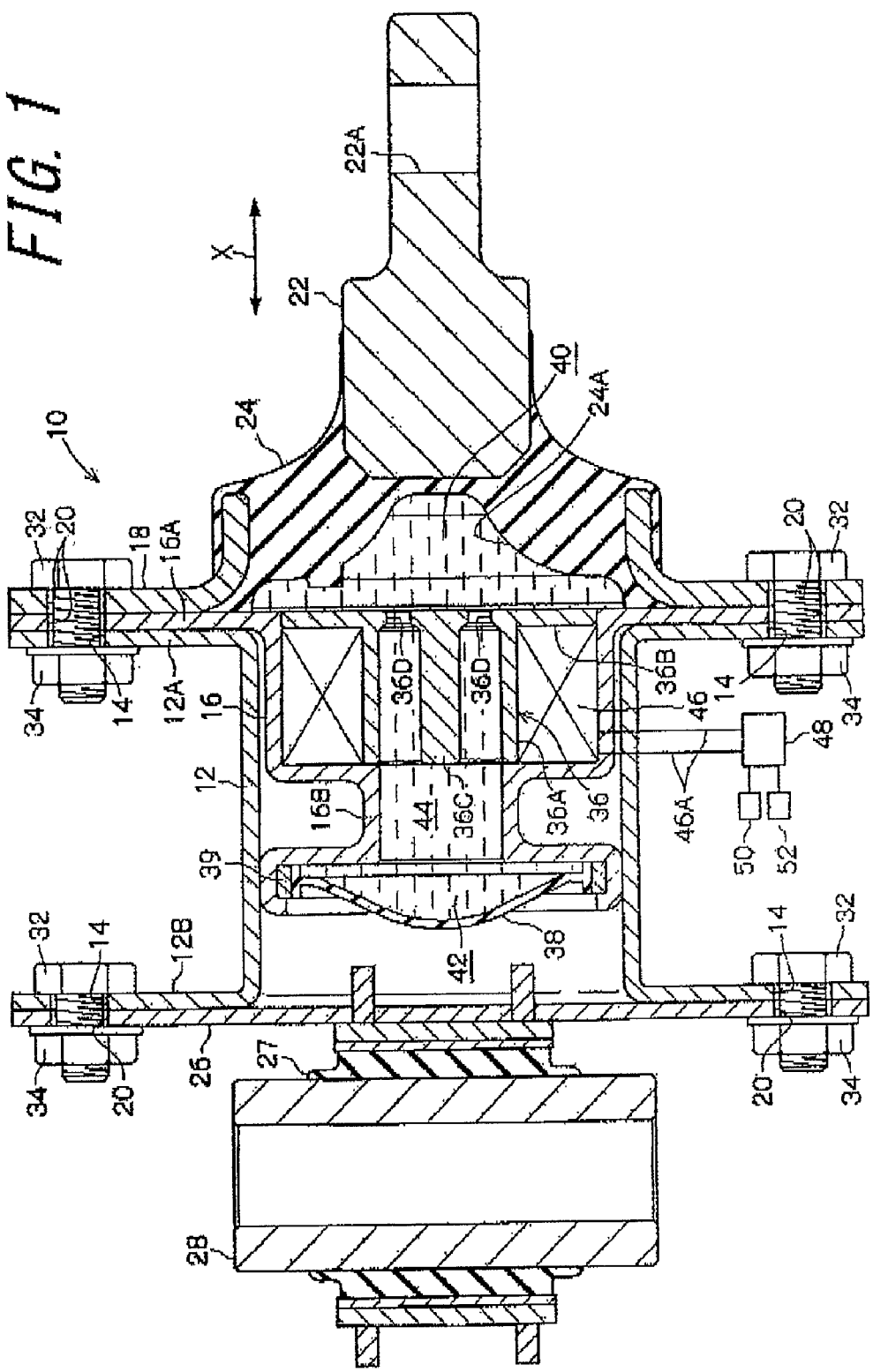
FIG. 1 is a sectional view showing a vibration damper of a first embodiment of the present invention.
Figure 2:
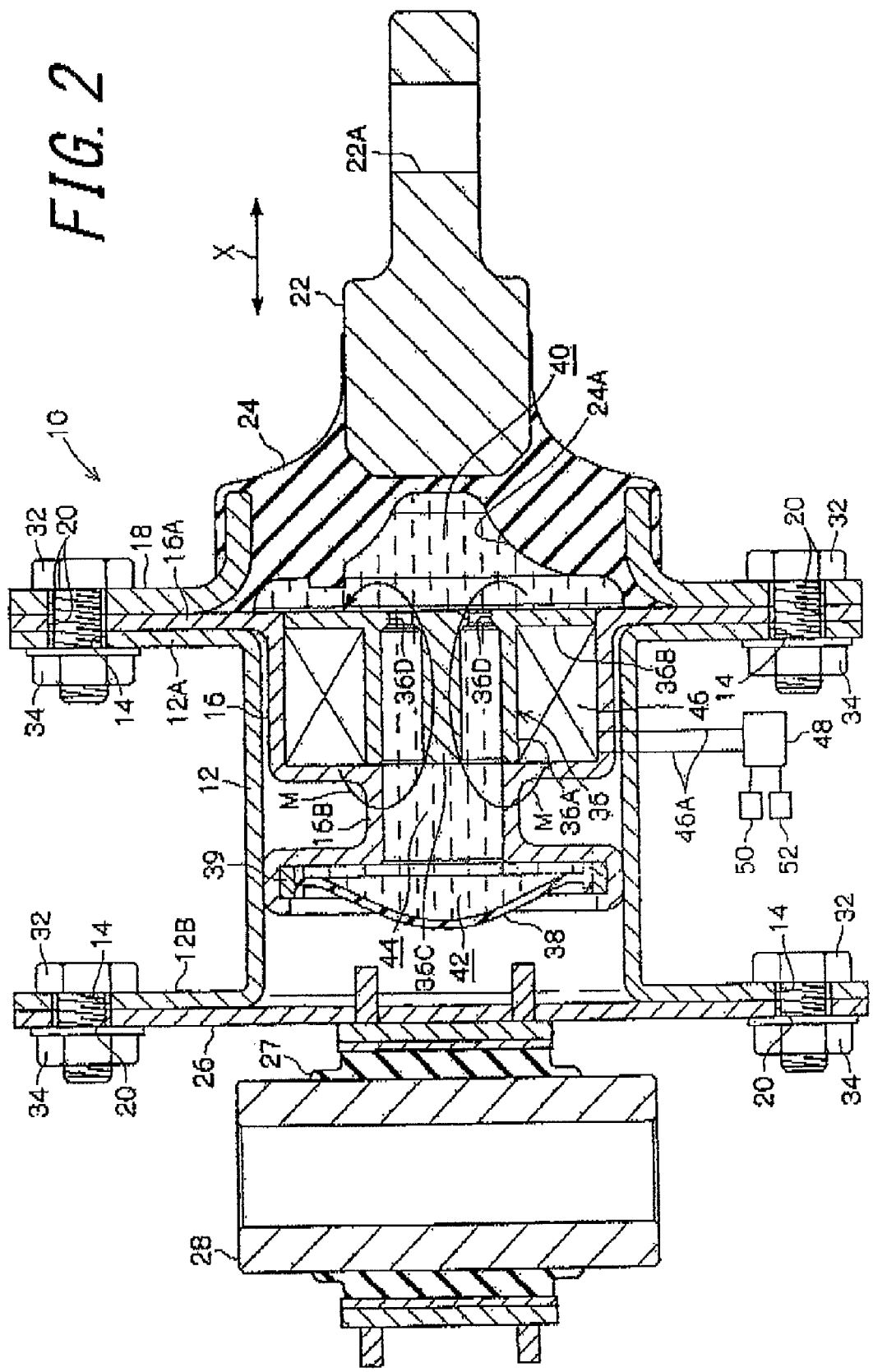
FIG. 2 is a sectional view showing the vibration damper of the first embodiment of the present invention, in a state in which a coil has been electrically activated.
Figure 3:
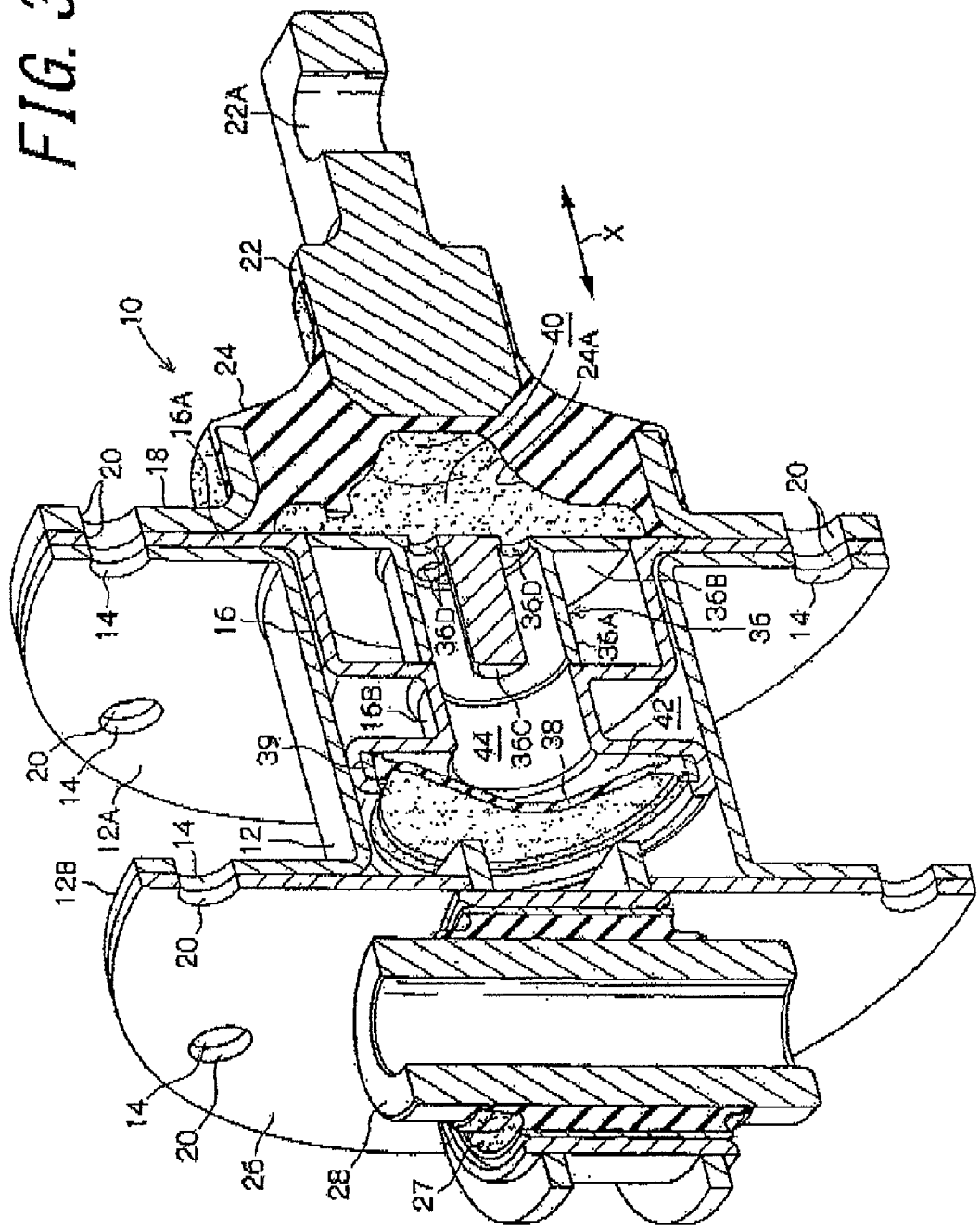
FIG. 3 is a sectional perspective view showing a main body portion of the vibration damper of the first embodiment of the present invention (the coil, magnetism responsive fluid, bolt, nut and the like are omitted).

A vibration damper of the present embodiment, as shown in FIGS. 1 to 3, is used as a torque rod or an engine mount in an automobile. The vibration damper is provided between a vehicle body as a vibration receiving portion and an engine as a vibration generating portion, to support the engine. Further, the direction X indicated by an arrow in the drawings represents an axial direction of the vibration damper 10 of the present embodiment The direction orthogonal to the axial direction will be referred to as the radial direction of the vibration damper 10 in following descriptions.

As shown in FIGS. 1 to 3, the vibration damper 10 includes an outer cylindrical metal member 12 made, for example, of aluminum of a cylindrical shape having a thin wall with two open ends in the axial direction. Flange portions 12A, 12B extending toward the radial direction outer peripheral side are respectively provided at both ends in the axial direction of the outer cylindrical metal member 12. Plural fastening holes 14 are formed at the outer peripheral side portion of each of a pair of the flange portions 12A, 12B.

A mounting member 22 as a first mounting member made of metal such as aluminum is provided on the axial direction one end side of the outer cylindrical metal member 12, at a position coaxial with the outer cylindrical metal member 12. A connecting hole 22A for connection with an engine is formed at the rear end portion of the mounting metal member 22. An intermediate cylinder 16 formed in a cylindrical shape by a metal material such as aluminum is fittingly engaged with the inner peripheral surface of the outer cylindrical metal member 12. A collar portion 16A having substantially the same outer diameter as that of the flange portion 12A of the outer cylindrical metal member 12 is formed on the axial direction one end side of the intermediate cylinder 16.

Further, a support ring 18 is provided adjacent to the collar portion 16A of the intermediate cylinder 16. The support ring 18 is formed of a ring-shaped metal material having a disc shape of which outer peripheral surface and outer diameter coincide with those of the flange portion 12A and the collar portion 16A. Specifically, the flange portion 12A and the support ring 18 are positioned abutting each other, with the collar portion 16A of the intermediate cylinder 16 interposed therebetween. A through hole 20 is formed at the respective portions of the collar 16A and the support ring 18 corresponding to the position of the fastening hole 14 of the flange portion 12A.

The outer cylindrical metal member 12, the intermediate cylinder 16 and the support ring 18 are connected with each other to have an integral structure by being fastened by a bolt 32 and a nut 34 inserted through the fastening hole 14 and the through hole 20.

A rubber elastic body 24 made rubber and formed in a thick disc-like shape as a whole is provided between the support ring 18 and the mounting metal member 22. At the central portion of the rubber elastic body 24 on the other end side in the axial direction, there is provided a recessed portion 24A which is recessed such that a section thereof taken along a direction orthogonal to the axial direction is a circular shape. The outer periphery portion of the rubber elastic body 24 is vulcanization-attached to a portion of the support ring 18 having a shape which rises up in the axial direction toward the inner peripheral side of the support ring 18. The center portion of the rubber elastic body 24 is vulcanization-attached to the outer peripheral surface of the mounting metal member 22. Due to this, the mounting metal member 22 and the support ring 18 are elastically connected with each other by the rubber elastic body 24.

On the side of the other end in the axial direction of the outer cylindrical metal member 12, a disc plate 26 for brake, formed by a metal material in a disc-like shape having the same diameter as the flange portion 12B of the outer cylindrical metal member 12, is disposed to abut the flange portion 12B. At the center portion of the disc plate 26 for bracket, a circular tube-like bracket 28 for fixedly connecting the vibration damper 10 to the vehicle body side is attached by way of a rubber ring material 27 or the is like. A through hole 20 is formed in a portion of the disc plate 26 for bracket at a position thereof corresponding to the fastening hole 14 of the flange portion 12B.

The outer cylindrical metal member 12 and the disc plate 26 for bracket are connected with each other to have an integral structure by being fastened by a bolt 32 and a nut 34 inserted trough the fastening hole 14 and the through hole 20. Due to the above-described structures, in the present embodiment, there is obtained a structure in which the outer cylindrical metal member 12, the intermediate cylinder 16, the disc plate 26 for bracket and the like are integrally formed and these members collectively constitute a second mounting member connected to the vehicle body side by way of the ring 27 and the bracket 28

On the other hand, as shown in FIGS. 1 to 3, the portion of the intermediate cylinder 16 on the side of the other end in the axial direction thereof is made to be a small diameter portion 16B of which diameter has been reduced. At a position coaxial with the intermediate cylinder 16 on the inner peripheral side thereof, a circular tube portion 36A of a yoke forming member 36, formed in a circular tube-like shape by an iron based metal material, is disposed such that the rear end side of the circular tube portion 36A abuts the end portion of the small diameter portion 16B of the intermediate cylinder 16.

On the axial direction one end side of the yoke forming member 36, a disc-shaped partition wall 36B is provided to be orthogonal to the circular tube portion 36A. The partition wall 36B is fittingly engaged with the inner peripheral side of the collar portion 16A of the intermediate cylinder 16, such that the partition wall 36B of the yoke forming member 36 is flush with the collar portion 16A of the intermediate cylinder 16.

Specifically, the collar portion 16A and the partition wall 36B are made to have a shape closing the recessed portion 24A of the rubber elastic body 24 and forming a space in the recessed portion 24A sectioned from the exterior. The space defines a pressure receiving liquid chamber 40 filled with a magnetism responsive fluid. That is, in the structure described above, at least a portion of the inner wall, of the pressure receiving liquid chamber 40 which is to be disposed on the inner peripheral side of the intermediate cylinder 16, is formed by the rubber elastic body 24.

A diaphragm 38 formed by rubber in a tin film-like shape and vulcanization-attached to the ring-shaped member 39 is engaged, together with the ring-shaped-shaped member 39, with the inner peripheral surface on the side of the other end in the axial direction of the intermediate cylinder 16 such that the diaphragm 38 closes the other end in the axial direction of the intermediate cylinder 16. As a result, a space sectioned from the exterior is formed by the diaphragm 38 and the intermediate cylinder 16 on the side of the other end in the axial direction of the intermediate cylinder 16. This space defines a secondary liquid chamber 42 filled with the magnetism responsive fluid.

As described above, the diaphragm 38 as a portion of the partition wall of the secondary liquid chamber 42 is structured to be elastically deformable along the anal direction such that the inner volume of the secondary liquid chamber 42 is increased/decreased in accordance with change in pressure of the magnetism responsive fluid filled in the secondary liquid chamber 42.

Further, a ring-shaped space is formed between the intermediate cylinder 16 and the yoke forming member 36, in which space a coil 46 is provided. Wiring 46A, extending from the both ends of the coil 46, is taken out tough the intermediate cylinder 16 and the outer cylindrical metal member 12 and connected with a controller 48.

The controller 48 is connected with a speed sensor 50 for detecting the vehicle speed and a rotation rate sensor 52 for detecting the rotation rate of the engine. The controller 48 is adapted to be able to determine the state of the engine and the state of the vehicle on the basis of signals as the information from these sensors 50, 52. That is, a control unit constituted of the controller 48 and the sensors 50, 52 effects control of electric activation of the coil 46.

Figure 4:
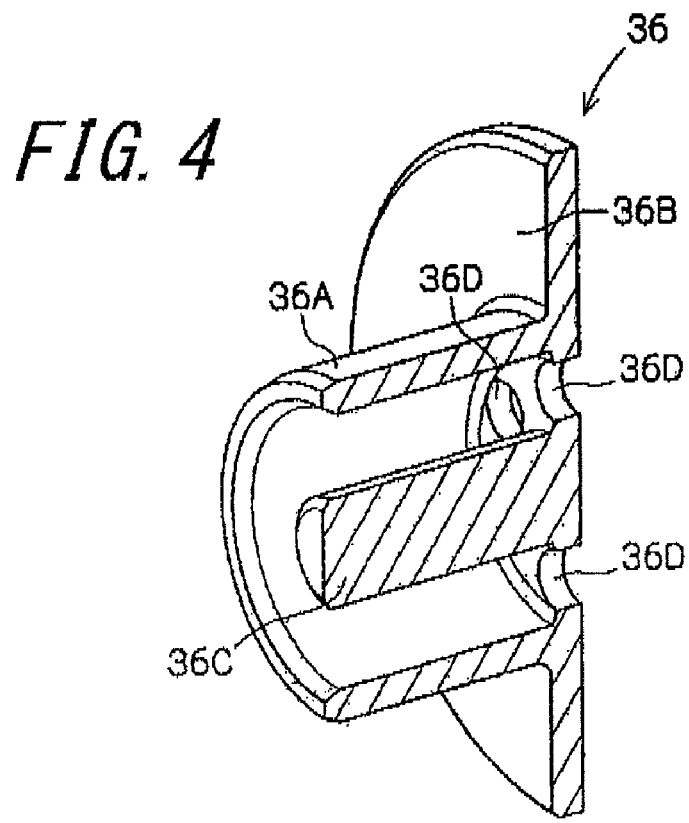
FIG. 4 is a sectional perspective view showing a yoke forming member applied to the vibration damper of the first embodiment of the present invention.

As shown in FIG. 4, a yoke portion 36C as a yoke formed in a shaft-like shape is provided at the center portion on the inner peripheral side of the circular tube portion 36A having a circular tube-like shape, of the yoke forming member 36. At a portion of the partition wall 36B between the yoke portion 36C and the circular tube member 36A, a plurality of through holes 36D are provided to form an annular outline.

Here, the through holes 36D and the circular tube portion 36A of the yoke forming member 36 and the small diameter portion 16B of the intermediate cylinder 16 form an orifice 44 as a restriction passage for communicating the pressure receiving liquid chamber 40 with the secondary liquid chamber 42. The pressure receiving chamber 40 and the secondary liquid chamber 42 communicate with each other by way of the orifice 44 such that the magnetism responsive fluid can flow in either direction between the pressure receiving liquid chamber 40 with the secondary liquid chamber 42.

As described above, in the present embodiment, the yoke forming member 36 positioned at the inner peripheral side of the coil 46 has the circular tube portion 36A having a tube-like shape and the yoke portion 36C is disposed on the inner peripheral side of the circular tube portion 36A such that the yoke portion 36C is situated, as shown in FIG. 2, along magnetic path M where magnetic field line generated upon electrical activation of the coil 46 passes. The coil 46 and the yoke 36C form an electromagnet. Further, the orifice 44 is formed such that it penetrates through the circular tube portion 36A. The through holes 36D formed in the yoke forming member 36 constitute a part of the orifice 44.

The controller 48 controls a timing of electrically activating the coil 46 disposed around the orifice 44 such that the magnetism responsive fluid in the orifice 44 is magnetized upon electric activation of the coil.

Next an action of the vibration damper 10 of the present embodiment, structured as described above, will be described. In the present embodiment, when the engine connected to the mounting metal member 22 constituting one end of the vibration damper 10 is activated, vibrations from the engine is transferred, by way of the mounting metal member 22, to the rubber elastic body 24 disposed between the mounting metal member 22 and the support ring 18 fastened to the outer cylindrical metal member 12 by a bolt 32 and the like. During this transfer, the rubber elastic body 24 acts as a vibration absorbing main body. That is, the rubber elastic body 24 is elastically deformed and the vibrations are absorbed due to the attenuating influence caused by the inner frictions or the like of the rubber elastic body 24, whereby vibrations transferred to the vehicle body side are reduced.

Further, in the present embodiment, as shown in FIG. 1, the pressure receiving liquid chamber 40 in which at least a portion of the inner wall thereof is formed of the rubber elastic body 24 communicates, by way of the orifice 44, with the secondary liquid chamber 42 in which a portion of the partition wall is formed deformable as the diaphragm 38. Due to this, when vibrations are inputted from the engine side, the inner volume of the pressure receiving liquid chamber 40 filled with the magnetism responsive fluid is increased/decreased in accordance with elastic deformation of the rubber elastic body 24, whereby the magnetism responsive fluid communicates in either direction, by way of the orifice 44, between the pressure receiving liquid chamber 40 and the secondary liquid chamber 42 in which the inner volume thereof can be increased/decreased in accordance with change in the inner pressure.

As a result, a resonance phenomenon occurs in the magnetism responsive fluid in the orifice 44, synchronous with the inputted vibrations, whereby the inputted vibrations can be effectively absorbed by change in pressure and viscosity resistance associated with the resonance phenomenon of the magnetism responsive fluid.

In the present embodiment, the circular tube 36A formed in a circular tube-like shape, of the yoke forming member 36, is disposed on the inner peripheral side of the coil 46. Further, the yoke portion 36C having a shaft-like shape is provided at the center portion of the yoke forming member 36 at a position which is to correspond, as shown in FIG. 2, to magnetic path M where magnetic field line generated upon electrical activation of the coil passes. Yet further, while the yoke portion 36C is provided inside the yoke forming member 36, the orifice 44 is formed to penetrate through the yoke forming member 36. Yet further, the through holes 36O formed in a portion of the partition all 36B around the yoke portion 36C of the yoke forming member 36 constitute a part of the orifice 44.

According to the present embodiment, the coil 46 is disposed around the orifice 44, and the controller 48 which determines the state of the engine and the state of the vehicle body on the basis of signals from the sensors 50, 52 controls timing of electrically activating the coil 46. Due to this, the magnetism responsive fluid in the orifice 44 is magnetized upon electric activating the coil 46 by the controller 48.

Specifically, when the coil 46 is electrically activated, the magnetism responsive fluid in the orifice 44 loses fluidity to be hardened, whereby not only the resonance phenomenon of the magnetism responsive fluid as described above is prevented from occurring but also the rubber elastic body 24 forming at least a part of the inner wall of the pressure receiving liquid chamber 40 is made less likely to deform. As a result, it is possible to instantly change or rapidly increase the spring constant of the vibration damper.

In the present embodiment, since the coil 46 is disposed around the orifice 44, electromagnetic force can be efficiently applied to the magnetism responsive fluid in the orifice 44. Further, in the present embodiment the wiring 46A can be easily extended from the coil 46 and there is substantially no possibility that the magnetism responsive fluid leaks from the portion where the wiring 46A comes out of the coil, whereby sealing properties of the magnetism responsive fluid can be improved.

According to the vibration damper 10 of the present embodiment as described above, since the coil 46 is disposed around the orifice 44, sealing properties of the magnetism responsive fluid can be improved and production cost can be reduced, while reliability is enhanced Further, since the yoke portion 36C is disposed within the orifice 44 so as to be situated along magnetic path M which is generated upon electrical activation of the coil 46, when the coil 46 is electrically activated, electromagnetic force is efficiently applied to the magnetism responsive fluid and thus the state of the magnetism responsive fluid can be changed by using less electric power than the conventional vibration damper, whereby the spring constant of the vibration damper can be instantly changed (e.g. in a few msec) or rapidly increased.

As a result, in a case in which the vibration damper 10 of the present embodiment is employed, for example, as a torque rod or an engine mount, the engine can be instantly supported in a fixed manner according to necessity and thus response to emergency braking of a vehicle and/or driving stability can be significantly improved.

Further, in the present embodiment, the circular tube portion 36A having a circular tube-like shape, of the yoke forming member 36 in which the shaft-like yoke portion 36C is provided at the center portion thereof and the trough holes 36D are formed around the yoke portion 36C, is disposed on the inner peripheral side of the coil 46. The orifice 44, a portion of which is constituted of the trough holes 36D formed in the yoke forming member 36, is formed so as to penetrate through the yoke forming member 36.

Specifically, the shaft-like yoke portion 36C is provided at the center portion of the circular tube portion 36A having a circular tube-like shape and disposed on the inner peripheral side of the coil 46, and the through holes 36D are formed around the yoke portion 36C. Since the orifice 44 is formed to include the through holes 36A as a part thereof, the vibration damper 10 can be made compact, while maintaining the capability of changing the state of the magnetism responsive fluid by using less electric power than conventional technologies.

Further, in the present embodiment, an engine represents the vibration generating portion, a vehicle body represents the vibration receiving portion, the control unit includes the sensors 50, 52 for respectively detecting the state of the engine and the state of the vehicle body, and the controller 48 of the control unit controls electrically activating the coil 46 on the basis of the information from these sensors 50, 52. Therefore, the controller 48 can reliably grasp the state of the engine and the state of the vehicle body and effect electrical activation of the coil 46 at an appropriate timing.

For example, during the normal running, the vibration damper 10 can have the same structure as the conventional liquid sealed-in type vibration damper by turning a voltage with respect to the coil 46 off and making it possible for the magnetism responsive fluid to flow within the orifice 44. When emergency braking and/or driving stability are necessitated, the spring constant of the vibration damper can be temporally increased by applying a voltage to the coil 46 and hardening the magnetism responsive fluid, so that it is possible to respond to emergency braking of the vehicle body and/or improve driving stability.

Figure 5:
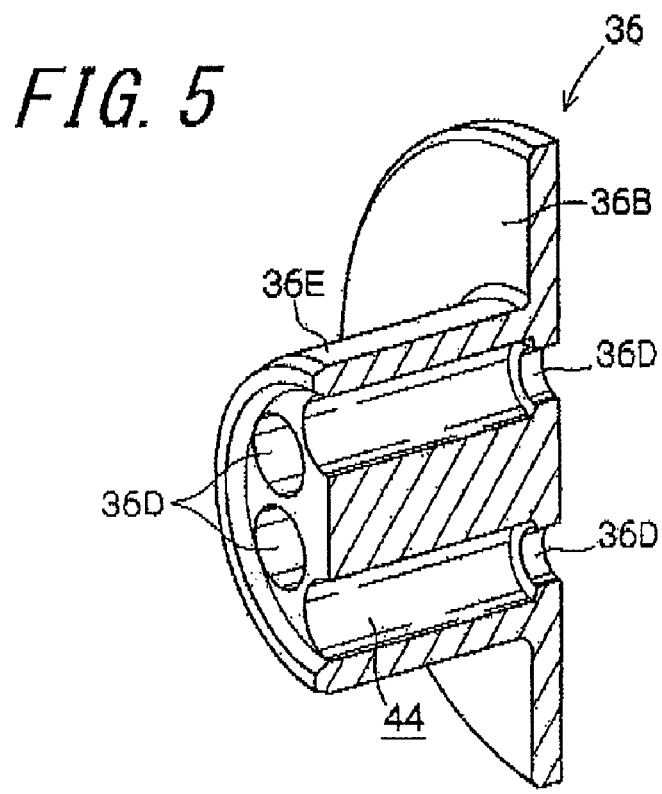
FIG. 5 is a sectional perspective view showing a yoke forming member applied to a vibration damper of a second embodiment of the present invention.

Next, a second embodiment of the present invention (a vibration damper of the second embodiment is shown in FIG. 5) will be described with reference to FIG. 5. It should be noted that the same reference numbers are assigned to the same members as those described in the first embodiment and explanation hereof will be omitted.

The first embodiment has a structure in which the shaft-like yoke portion 36C is disposed at the center portion of the circular tube portion 36A of the yoke forming member 36. In contrast, in the vibration damper 10 of the present embodiment, the circular tube portion 36A is replaced with a hollowed column portion 36E as shown in FIG. 5. That is, the yoke forming member 36 has a structure in which the plural through holes 36D formed in a portion of the partition wall 36B respectively penetrate through the hollowed column portion 36E.

Specifically, in the present embodiment, the hollowed column portion 36E itself of the yoke forming member 36 is structured as a yoke and the hollowed column portion 36E is designed such that the plural through holes 36D penetrate therethrough to configure the hollowed column portion 36E into a lotus root-like shape. Accordingly, the present embodiment not only has an effect similar to that of the first embodiment but also is capable of applying electromagnetic force more strongly to the magnetism responsive fluid in the orifice 44 than the first embodiment. As a result it is possible to change the state of the magnetism responsive fluid by using less electric power than the first embodiment.

Figure 6:
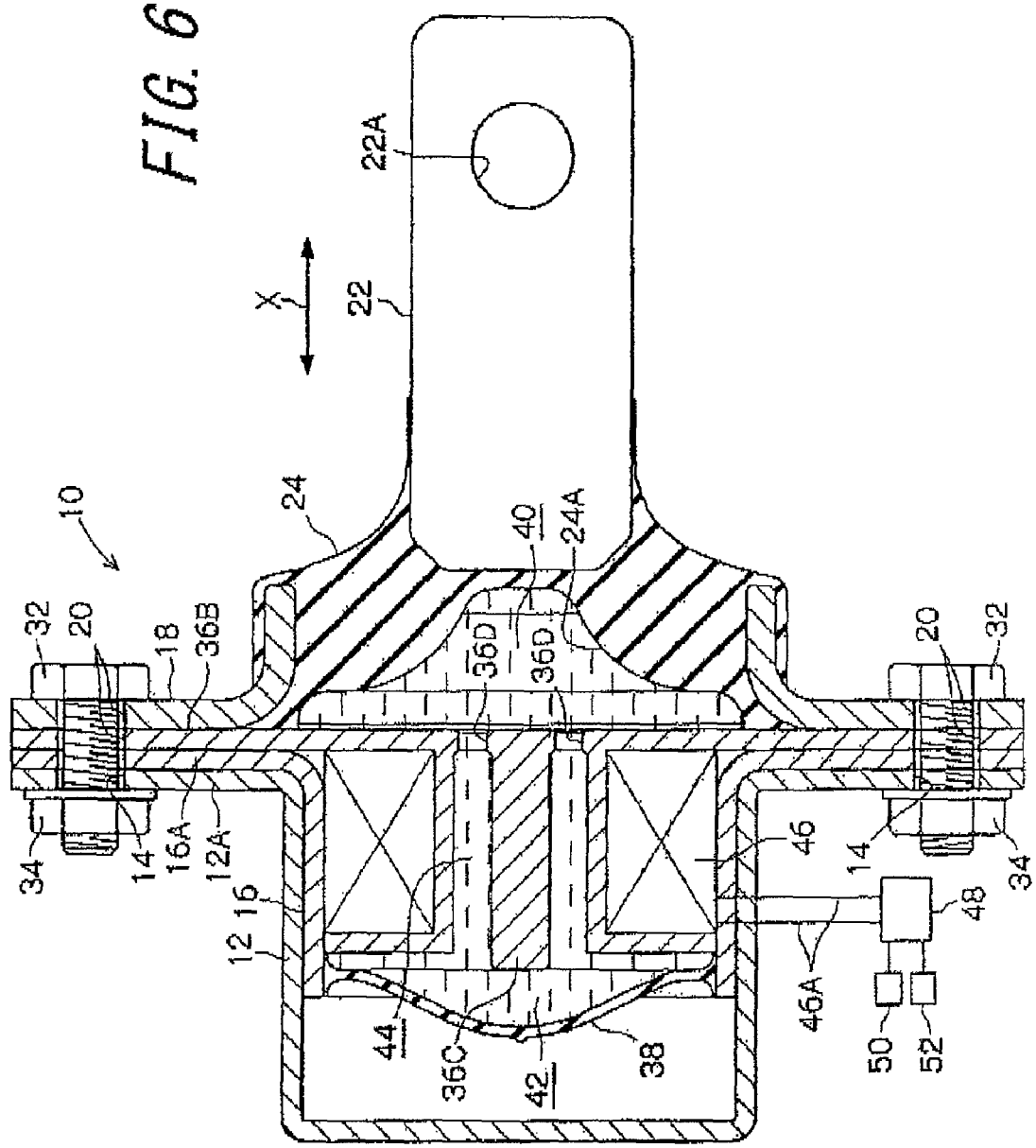
FIG. 6 is a sectional view showing a vibration damper of a third embodiment of the present invention, taken along the line 66 of FIG. 7.
Figure 7:
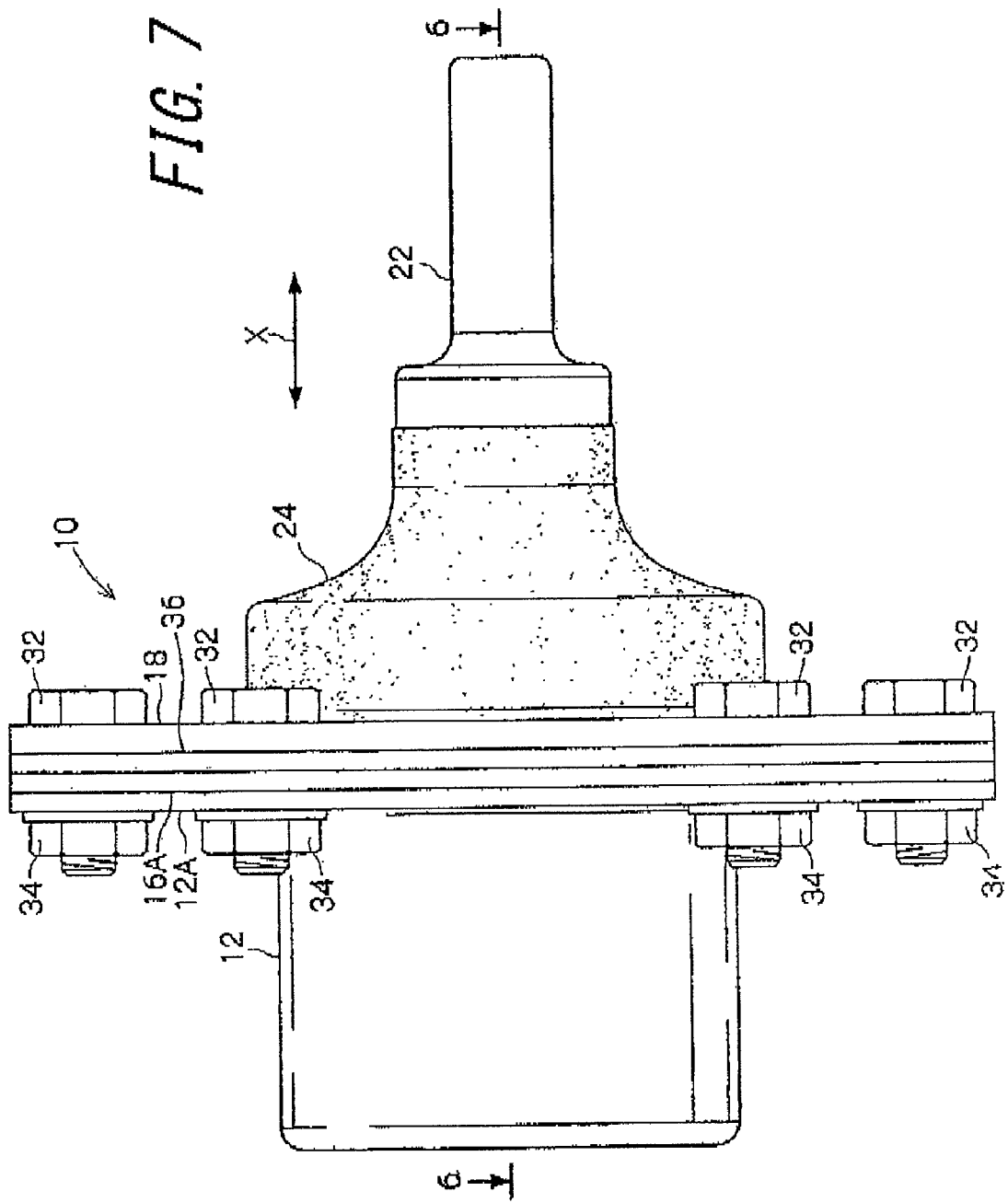
FIG. 7 is a side view showing the vibration damper of the third embodiment of the present invention.

Next, a third embodiment of the present invention (a vibration damper of the third embodiment is shown in FIGS. 6 and 7) will be described with reference to FIGS. 6 and 7. It should be noted that the same reference numbers are assigned to the same members as those described in the first embodiment and explanation thereof will be omitted.

The first embodiment has a structure in which the axial direction ends of the outer cylindrical metal member 12 are opened, respectively, and the intermediate cylinder 16 has at a portion on the side of the other end in the axial direction thereof the small diameter portion 16B of which diameter has been reduced. Instead, in the vibration damper 10 of the present embodiment, the other end portion in the axial direction of the outer cylindrical metal member 12 is closed and the intermediate cylinder 16 lacks the small diameter portion 16B, as shown in FIGS. 6 and 7. Therefore, in the present embodiment the entire length of the vibration damper 10 and the orifice 44 are shorter than those of the first embodiment.

Further, the present embodiment has a structure in which the partition wall 36B of the yoke forming member 36 is formed to have larger diameter than that of the first embodiment, this relatively large partition wall 36B is interposed between the collar portion 16A of the intermediate cylinder 16 and the support ring 18, and these members are fastened, as well as the flange portion 12A of the outer cylindrical metal member 12, to the vehicle body side.

As described above, the present embodiment has a structure similar to that of the first embodiment and, due to this, has an effect similar to that of the first embodiment. However, according to the present embodiment, the vibration damper 10 can be made compact, as compared with the first embodiment.

Figure 8:
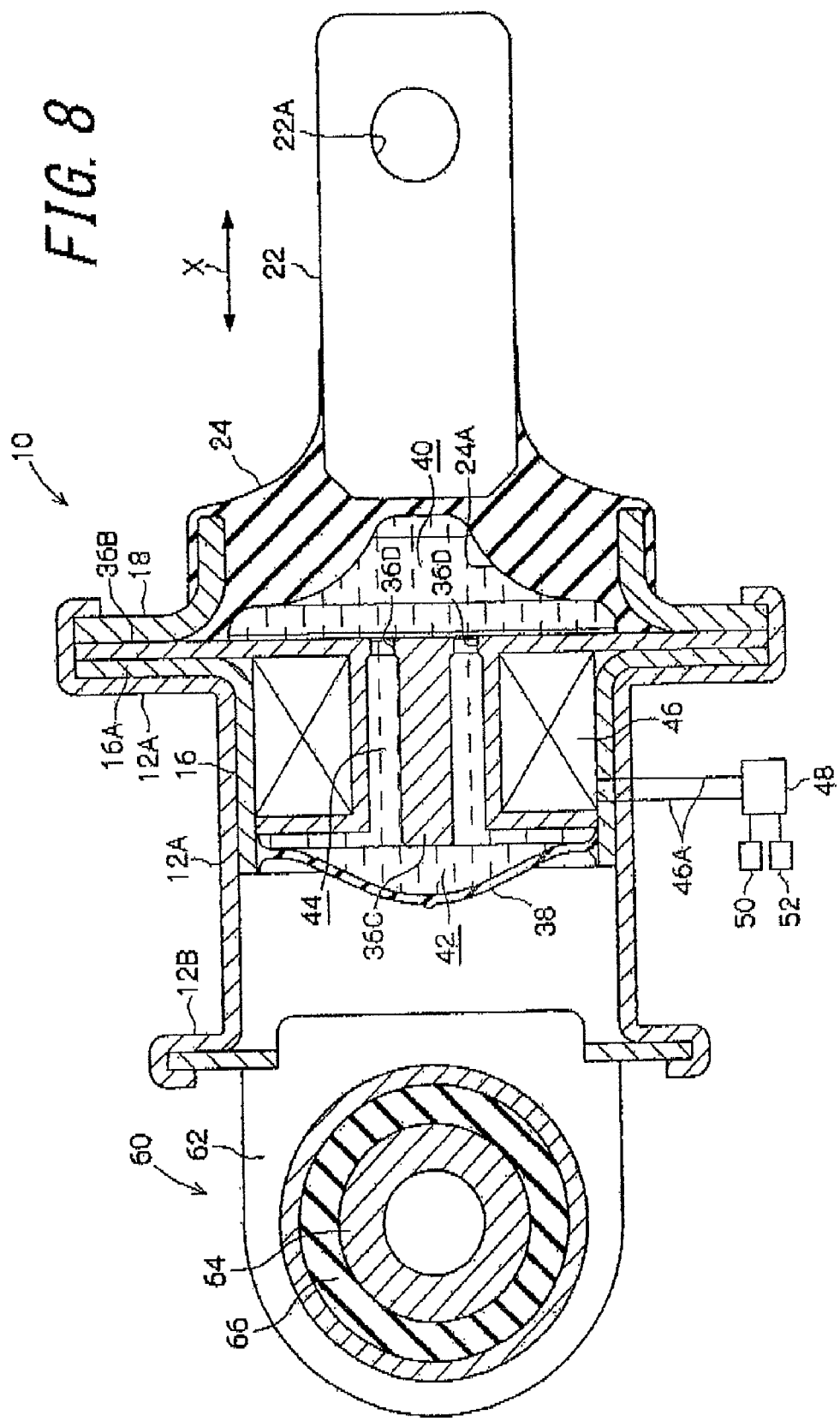
FIG. 8 is a sectional view showing a vibration damper of a fourth embodiment of the present invention, taken along the line 8-8 of FIG. 9.
Figure 9:
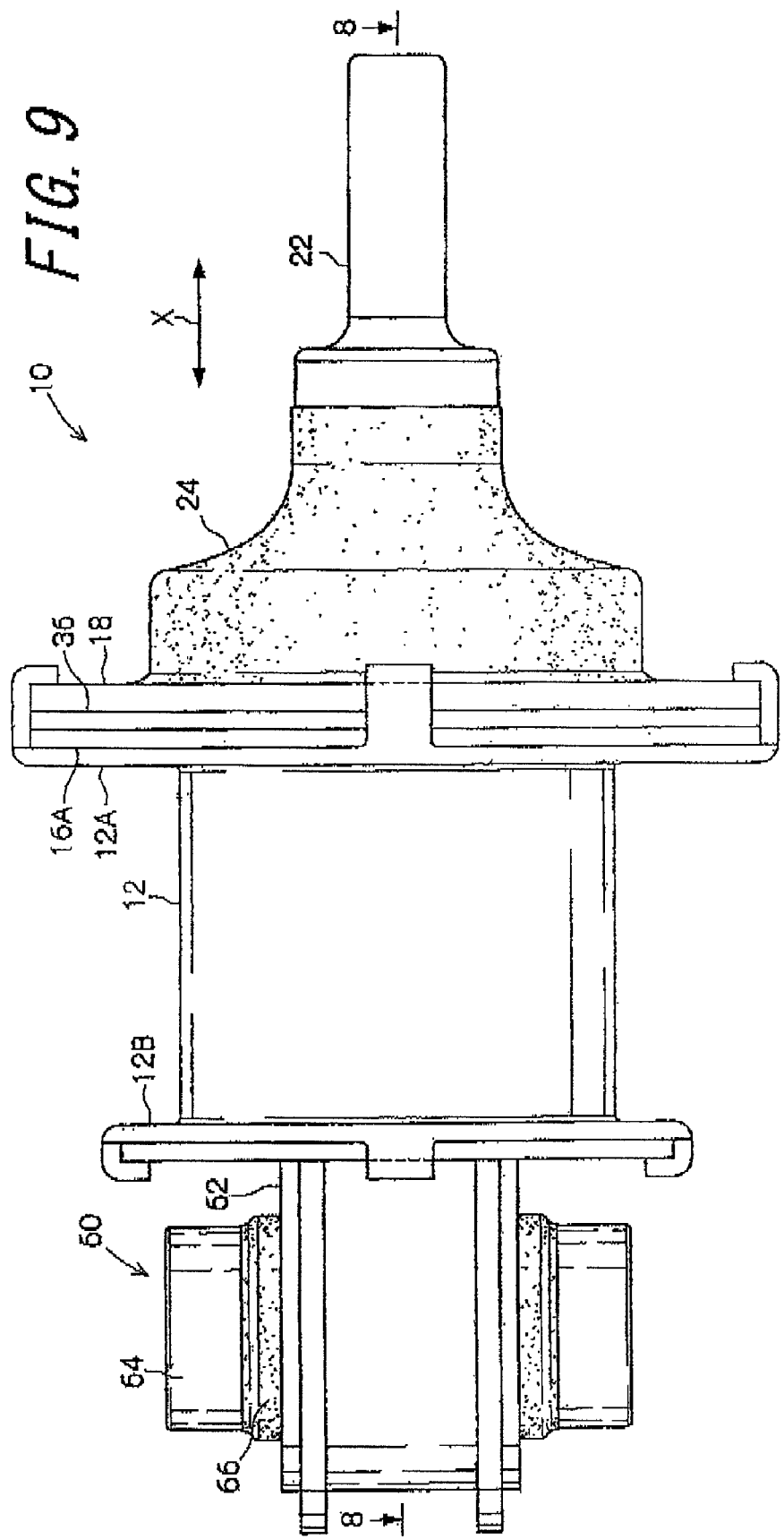
FIG. 9 is a side view showing the vibration damper of the fourth embodiment of the present invention.
Figure 10:
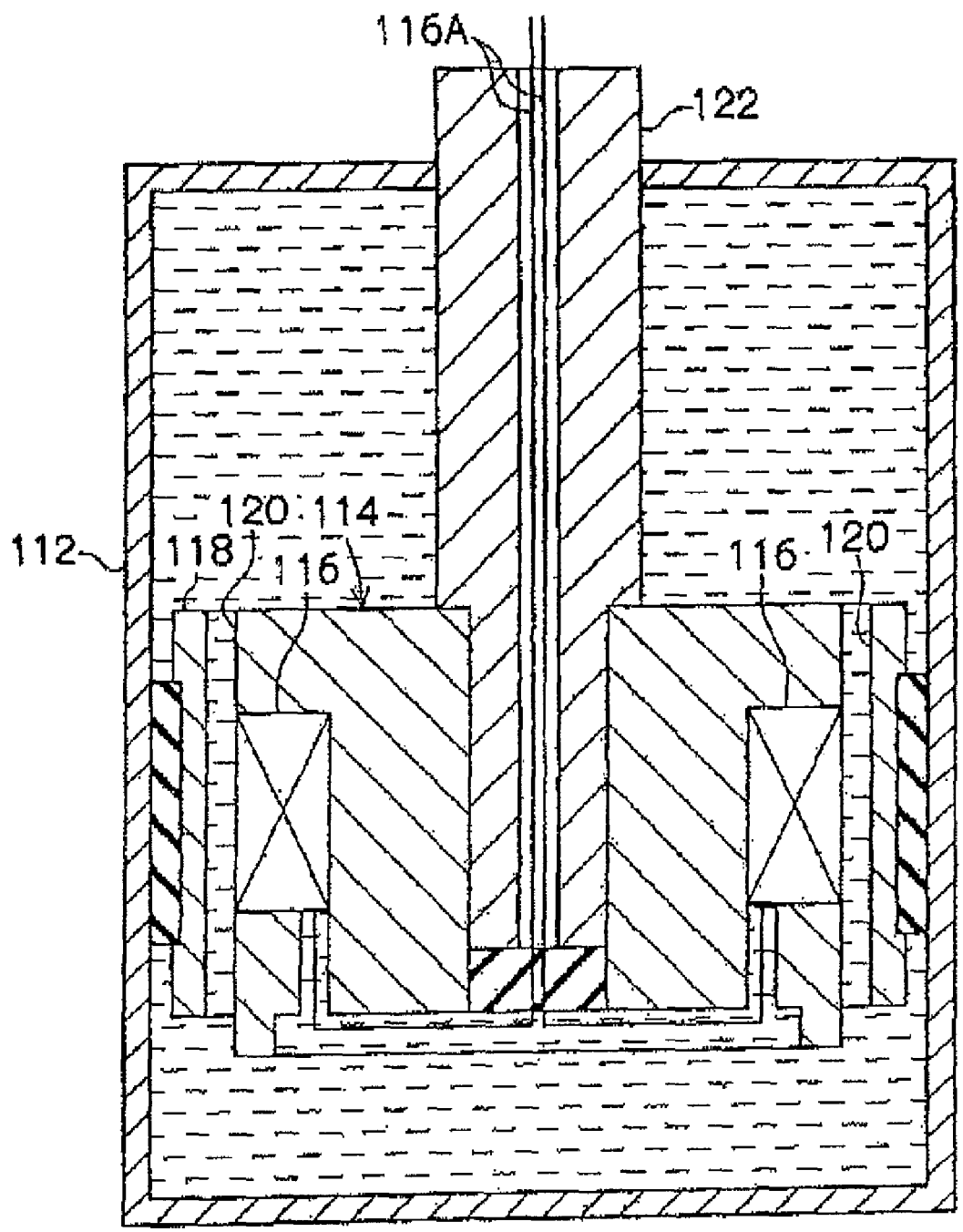
FIG. 10 is a side view showing an electromagnetic actuator of the conventional techniques.

Next, a fourth embodiment of the present invention (a vibration damper of the fourth embodiment is shown in FIGS. 8 and 9) will be described with reference to FIGS. 8 and 9. It should be noted that the same reference numbers are assigned to the same members as those described in the first and third embodiments and explanation thereof will be omitted.

The present embodiment has a structure similar to that of the third embodiment. However, in the structure of the present embodiment, as shown in FIGS. 8 and 9, the both ends in the axial direction of the outer cylindrical metal member 12 are opened as in the first embodiment, the intermediate cylinder 16, the support ring 18 and the yoke forming member 36 are connected to the outer cylindrical metal member 12 by calking the outer peripheral portion of the flange 12A of the outer cylindrical metal is member 12 therewith, and a bush 60 is connected with the outer cylindrical metal member 12 by caulking the outer peripheral portion of the flange portion 12B therewith.

Specifically, the bush 60 includes a connecting metal member 62 for connection to the flange portion 12B, an inner cylindrical metal member 64 formed in a cylindrical shape and disposed within the connecting metal member 62, a rubber ring 66 formed by rubber in a ring-like shape and disposed between the connecting metal member 62 and the inner cylindrical metal member 64, and the like, such that the inner cylindrical metal member 64 is connected to the vehicle body side.

Due to the structures described above, the vibration damper 10 of the present embodiment has an effect similar to that of the first and third embodiments. However, according to the present embodiment, when the spring constant of the vibration damper is increased by changing the state of the magnetism responsive fluid, deformation of minimally required degree can be reliably achieved due to presence of the bush 60.

In each vibration damper 10 of the respective embodiments described above, the outer cylindrical metal member 12 and the like are connected to the vehicle body side and the mounting member 22 is connected to the engine. However, contrary to this configuration, it is acceptable that the outer cylindrical metal member 12 and the like are connected to the engine and the mounting member 22 is connected to the vehicle body side.

Further, in the respective embodiments described above, each vibration damper is provided to prevent vibrations from affecting a vehicle body. However, needless to say, the vibration damper of the present invention can be employed for other applications, e.g. applications to a structure other than a vehicle. Yet further, it should be noted that shapes, dimensions, etc. of the outer cylindrical metal member 12, the mounting member 22, the rubber elastic body 24 and the like are not limited to those described in the aforementioned embodiments.

The invention claimed is:

1. A vibration damper comprising:

a first mounting member connected to one of a vibration generating portion and a vibration receiving portion;

a second mounting member connected to the other of the vibration generating portion and the vibration receiving portion;

an elastic body provided between the first mounting member and the second mounting member to connect the first mounting member and the second mounting member in an elastically deformable manner;

a pressure-receiving liquid chamber filled with a magnetism responsive fluid, at least a portion of an inner wall of the pressure-receiving liquid chamber being formed of the elastic body;

a secondary liquid chamber, a portion of a partition wall thereof being formed deformable such that an inner volume of the secondary liquid chamber can be increased/decreased in accordance with change in an inner pressure;

an orifice communicating between the pressure-receiving liquid chamber and the secondary liquid chamber to allow the magnetism responsive fluid to pass therethrough;

a coil provided around the orifice, for magnetizing the magnetism responsive fluid inside the orifice when the coil is electrically activated; and a control unit for controlling electric activation of the coil, wherein a yoke is provided in the orifice, separately therefrom, such that the yoke is situated on a magnetic path which is generated when the coil is electrically activated, and wherein a yoke forming member including a yoke as a portion thereof is formed in a tube-like shape and the orifice is formed such that it penetrates through the yoke forming member.

2. The vibration damper of claim 1, wherein the vibration generating portion is an engine, the vibration receiving portion is a vehicle body, the control unit includes sensors for detecting states of the engine and the vehicle body, and the control unit controls electric activation of the coil on the basis of information from the sensors.

3. A vibration damper comprising:

a first mounting member connected to one of a vibration generating portion and a vibration receiving portion;

a second mounting member connected to the other of the vibration generating portion and the vibration receiving portion;

an elastic body provided between the first mounting member and the second mounting member to connect the first mounting member and the second mounting member in an elastically deformable manner;

a pressure-receiving liquid chamber filled with a magnetism responsive fluid, at least a portion of an inner wall of the pressure-receiving liquid chamber being formed of the elastic body;

a secondary liquid chamber, a portion of a partition wall thereof being formed deformable such that an inner volume of the secondary liquid chamber can be increased/decreased in accordance with change in an inner pressure;

an orifice communicating between the pressure-receiving liquid chamber and the secondary liquid chamber to allow the magnetism responsive fluid to pass therethrough;

a coil provided around the orifice, for magnetizing the magnetism responsive fluid inside the orifice when the coil is electrically activated; and a control unit for controlling electric activation of the coil, wherein a yoke forming member, having a shaft-like yoke provided at the center portion thereof and through holes formed around the yoke, is disposed on the inner peripheral side of the coil and the through holes provided in the yoke forming member constitute a part of the orifice.

* * * * *